(12) United States Patent
Dufour et al.

(10) Patent No.: US 8,553,530 B1
(45) Date of Patent: Oct. 8, 2013

(54) OPERATING STATE CONTROL IN REDUNDANCY PROTECTION SYSTEMS

(75) Inventors: Allan Dennis Dufour, Gatineau (CA); Thomas Gsell, Kanata (CA); Haijun Liu, Ottawa (CA)

(73) Assignee: Dragonwave Inc., Kanata, ON (CA)

( * ) Notice: Subject to any disclaimer, the term of this patent is extended or adjusted under 35 U.S.C. 154(b) by 44 days.

(21) Appl. No.: 12/382,031

(22) Filed: Mar. 6, 2009

(51) Int. Cl.
*H04L 12/26* (2006.01)

(52) U.S. Cl.
USPC ............ 370/217; 370/219; 370/220; 370/221

(58) Field of Classification Search
None
See application file for complete search history.

(56) References Cited

U.S. PATENT DOCUMENTS

| | | | |
|---|---|---|---|
| 7,603,033 B1 * | 10/2009 | Lumetta et al. | 398/5 |
| 2004/0037566 A1 * | 2/2004 | Willebrand et al. | 398/115 |
| 2005/0036442 A1 * | 2/2005 | Saleh et al. | 370/216 |
| 2006/0218609 A1 * | 9/2006 | Johnson et al. | 725/105 |
| 2007/0195723 A1 * | 8/2007 | Attar et al. | 370/318 |
| 2007/0280102 A1 * | 12/2007 | Vasseur et al. | 370/225 |

OTHER PUBLICATIONS

"Synchronous Optical Network (SONET) Transport Systems: Common Generic Criteria", GR-253-CORE, Issue 4, Dec. 2005, and is available at the following link: http://linkteltech.com/down/GR-253-CORE%20Issue%204.pdf.

* cited by examiner

*Primary Examiner* — Otis L Thompson, Jr.

(57) ABSTRACT

Operating state control in redundancy protection systems is disclosed. One protecting apparatus of a redundant pair is selected to be in a first operating state in the redundant pair. Protected communication equipment for which the redundant pair provides redundancy protection transmits, to only the selected apparatus, communication traffic that includes content for further transmission from both protecting apparatus in the redundant pair. This causes the selected protecting apparatus to transition to or remain in the first operating state and the other protecting apparatus to transition to or remain in a second operating state. A protecting apparatus determines that it is to be in the first operating state if communication traffic received from the protected equipment includes content for further transmission from the protecting apparatus, and determines that it is to be in the second operating state if the received communication traffic includes no such content.

18 Claims, 5 Drawing Sheets

OPERATING STATE CONTROL IN REDUNDANCY PROTECTION SYSTEMS

FIELD OF THE INVENTION

This invention relates generally to redundancy protection and, in particular, to controlling operating states of redundant components.

BACKGROUND

Automatic Protection Switching (APS) for Synchronous Optical NETwork (SONET)/Synchronous Digital Hierarchy (SDH) technology according to the GR-253-CORE specification entitled "Synchronous Optical Network (SONET) Transport Systems: Common Generic Criteria", for example, requires fault detection in SONET/SDH connections to subtending equipment, or in the SONET/SDH equipment itself. In a 1+1 linear APS implementation, traffic is electrically bridged from a working connection to a protection connection at transmitting equipment, and receiving equipment normally selects traffic from the working connection. A fault or other condition affecting the working SONET/SDH connection causes an APS operation, and traffic is then selected from the protection connection.

This type of redundancy protection tends to be implemented in a single equipment chassis. This can significantly limit the actual level of protection that is provided, in that a failure affecting one equipment installation would interrupt traffic flow.

Such a protection mechanism also provides protection only for the optical SONET/SDH connections, and not for further connections, such as access-side connections from which traffic for SONET/SDH connections originates. APS operations are driven only by optical connection faults or failures.

SUMMARY

According to one aspect of the invention, an apparatus includes a state module and a traffic processor. The state module selects one of first communication equipment and second communication equipment of a redundant pair to be in a first operating state. The redundant pair provides redundancy protection for communication traffic associated with the apparatus. The traffic processor is operatively coupled to the state module, and transmits to only the selected one of the first communication equipment and the second communication equipment communication traffic including content for further transmission from the first communication equipment and the second communication equipment, to thereby cause the selected one of the first communication equipment and the second communication equipment to transition to or remain in the first operating state and the other of the first communication equipment and the second communication equipment to transition to or remain in a second operating state in the redundant pair.

The traffic processor may also transmit maintenance signals to the first communication equipment and the second communication equipment, in which case the state module may select one of the first communication equipment and the second communication equipment to be in the first operating state based on responses to the maintenance signals by the first communication equipment and the second communication equipment.

In some embodiments, the traffic processor transmits a plurality of maintenance signals to the first communication equipment and the second communication equipment, and the state module selects the one of the first communication equipment and the second communication equipment from which a predetermined number of responses to the maintenance signals is first received.

The state module may further detect an operating state switching condition, and select the other of the first communication equipment and the second communication equipment to be in the first operating state responsive to detection of the operating state switching condition. The traffic processor then transmits to only the other of the first communication equipment and the second communication equipment communication traffic including content for further transmission from the first communication equipment and the second communication equipment, to thereby cause the other of the first communication equipment and the second communication equipment to transition to the first operating state and the one of the first communication equipment and the second communication equipment to transition to the second operating state.

Correction of the state switching condition may also be corrected by the state switching module, which may then select the one of the first communication equipment and the second communication equipment to be in the first operating state responsive to detection of correction of the operating state switching condition. The traffic processor transmits to only the one of the first communication equipment and the second communication equipment communication traffic including content for further transmission from the first communication equipment and the second communication equipment, to thereby cause the one of the first communication equipment and the second communication equipment to revert to the first operating state and the other of the first communication equipment and the second communication equipment to revert to the second operating state.

In some embodiments, the traffic processor includes in the communication traffic transmitted to only the one of the first communication equipment and the second communication equipment a first indication that the communication traffic includes content for further transmission from the first communication equipment and the second communication equipment. The traffic processor may include in each of the maintenance signals a second indication that the maintenance signal includes no content for further transmission from the first communication equipment and the second communication equipment. The first communication equipment and the second communication equipment may respond to the maintenance signals with either the second indication or, if the communication equipment has been selected to be in the first operating state by another apparatus for which the redundant pair provides redundancy protection, with a third indication that the communication equipment has been selected by the other apparatus to be in the first operating state.

The apparatus may be implemented, for example, in a system that also includes the first communication equipment and the second communication equipment, with the selected one of the first communication equipment and the second communication equipment determining that it has been selected to be in the first operating state responsive to receiving the communication traffic including content for further transmission from the first communication equipment and the second communication equipment.

A method according to another aspect of the invention includes selecting one of first communication equipment and second communication equipment of a redundant pair to be in a first operating state, the redundant pair providing redundancy protection for communication traffic associated with an apparatus; and transmitting to only the selected one of the first communication equipment and the second communication equipment communication traffic including content for further transmission from the first communication equipment and the second communication equipment, to thereby cause the selected one of the first communication equipment and the second communication equipment to transition to or remain in the first operating state and the other of the first communication equipment and the second communication equipment to transition to or remain in a second operating state in the redundant pair.

The method may also include transmitting maintenance signals to the first communication equipment and the second communication equipment, in which case selecting may involve selecting one of the first communication equipment and the second communication equipment to be in the first operating state based on responses to the maintenance signals by the first communication equipment and the second communication equipment.

In some embodiments, the method includes detecting an operating state switching condition; selecting the other of the first communication equipment and the second communication equipment to be in the first operating state responsive to detection of the operating state switching condition; and transmitting to only the other of the first communication equipment and the second communication equipment communication traffic including content for further transmission from the first communication equipment and the second communication equipment, to thereby cause the other of the first communication equipment and the second communication equipment to transition to the first operating state and the one of the first communication equipment and the second communication equipment to transition to the second operating state.

Correction of the state switching condition may be detected, and the method may also include selecting the one of the first communication equipment and the second communication equipment to be in the first operating state responsive to detection of correction of the operating state switching condition; and transmitting to only the one of the first communication equipment and the second communication equipment communication traffic including content for further transmission from the first communication equipment and the second communication equipment, to thereby cause the one of the first communication equipment and the second communication equipment to revert to the first operating state and the other of the first communication equipment and the second communication equipment to revert to the second operating state.

In some embodiments, the method includes receiving, at the selected one of the first communication equipment and the second communication equipment, the communication traffic including content for further transmission from the first communication equipment and the second communication equipment, the selected one of the first communication equipment and the second communication equipment determining that it has been selected to be in the first operating state responsive to receiving the communication traffic including content for further transmission from the first communication equipment and the second communication equipment.

Such a method may be embodied, for example, in a computer-readable medium encoded with computer executable instructions which when executed cause a computer to perform the method.

Another aspect of the invention provides an apparatus including an interface that enables communications with communication equipment for which the apparatus, in combination with a further apparatus in a redundant pair, provides redundancy protection; and a state module operatively coupled to the interface, the state module determining that the apparatus is to be in a first operating state in the redundant pair where communication traffic received from the communication equipment includes content for further transmission from the apparatus and the further apparatus, and determining that the apparatus is to be in a second operating state in the redundant pair where the received communication traffic includes no content for further transmission from the apparatus and the further apparatus.

The state module may further cause responses to maintenance signals received from the communication equipment to be transmitted from the apparatus to the communication equipment, the responses being for use by the communication equipment in determining whether to select the apparatus to be in the first operating state.

In some embodiments, communication traffic that includes content for further transmission from the apparatus and the further apparatus includes a first indication, the maintenance signals include a second indication that the maintenance signals include no content for further transmission from the apparatus and the further apparatus, and the responses to the maintenance signals include either the second indication or, if the apparatus has been selected to be in the first operating state by further communication equipment for which the redundant pair provides redundancy protection, a third indication that the apparatus has been selected by the further communication equipment to be in the first operating state.

The apparatus might also include an optical interface that enables communications with optical communication equipment, for which the redundant pair further provides redundancy protection. In one embodiment, the interface is an Ethernet interface, and the state module further determines, when the apparatus is to be in the second operating state, whether the apparatus is to change from the first operating state to the second operating state, and, where the apparatus is to change from the first operating state to the second operating state, causes optical signalling to be sent to the optical communication equipment to signal to the optical communication equipment the change in operating state.

A method according to a further aspect of the invention includes receiving, at an apparatus, communication traffic from communication equipment for which the apparatus, in combination with a further apparatus in a redundant pair, provides redundancy protection; determining that the apparatus is to be in a first operating state in the redundant pair where the communication traffic received from the communication equipment includes content for further transmission from the apparatus and the further apparatus; and determining that the apparatus is to be in a second operating state in the redundant pair where the received communication traffic includes no content for further transmission from the apparatus and the further apparatus.

The method may also include receiving maintenance signals from the communication equipment; and transmitting responses to the maintenance signals from the apparatus to the communication equipment, the responses being for use by the communication equipment in determining whether to select the apparatus to be in the first operating state.

In some embodiments, communication traffic that includes content for further transmission from the apparatus and the further apparatus includes a first indication, the maintenance signals include a second indication that the maintenance signals include no content for further transmission from the apparatus and the further apparatus, and the responses to the maintenance signals include either the second indication or, if the apparatus has been selected to be in the first operating state by further communication equipment for which the redundant pair provides redundancy protection, a third indication that the apparatus has been selected by the further communication equipment to be in the first operating state.

The communication traffic may be Ethernet traffic in some embodiments, and the content could be content for further transmission from the apparatus and the further apparatus to optical communication equipment, for which the redundant pair further provides redundancy protection. In this case, the method may also include determining, when the apparatus is to be in the second operating state, whether the apparatus is to change from the first operating state to the second operating state; and signalling the change in operating state to the optical equipment, where the apparatus is to change from the first operating state to the second operating state.

Like the methods described earlier, such a method may be embodied in a computer-readable medium encoded with computer executable instructions which when executed cause a computer to perform the method.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Some embodiments of the invention allow for a SONET/SDH protection switching mechanism to be driven from non-optical connections, such as an Ethernet domain side of equipment or a system in which SONET/SDH connections interoperate with Ethernet connections. Ethernet side equipment faults or failures can potentially be promulgated or propagated to SONET/SDH subtending equipment in some embodiments.

More generally, embodiments of the present invention may provide a mechanism whereby operating states of redundant components are controlled remotely, from equipment for which redundancy protection is being provided. The current operating state of a redundant component can be determined by each redundant component passively, based on received communication traffic, without requiring separate and dedicated signalling for operating state control.

Figure 1:
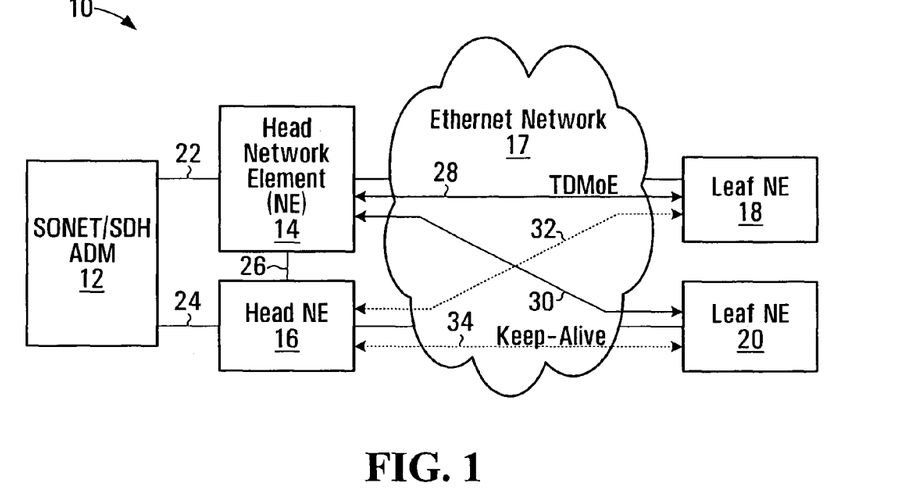
FIG. 1 is a block diagram of an example communication network implementation.

FIG. 1 is a block diagram of an example communication network implementation. The example communication network 10 includes a SONET/SDH Add Drop Multiplexer (ADM) 12 coupled to head network elements 14, 16 through respective optical links 22, 24. The head network elements 14, 16 are also coupled to each other through a connection 26, and to leaf network elements 18, 20 through an Ethernet network 17. Communications between the head network elements 14, 16 and the leaf network elements 18, 20 are represented in FIG. 1 at 28, 30, 32, 34. It should be appreciated that the system of FIG. 1, as well as the contents of the other drawings, are intended solely for illustrative purposes, and that the present invention is in no way limited to the particular example embodiments explicitly shown in the drawings and described herein.

In one common architecture, optical and multiplexer network elements convert and transfer communication traffic between access-side T1 connections, which are often leased lines, and network-side optical links. T1 connections might be leased to carry traffic from base stations in a wireless network back to an optical aggregation point and into a core network, for instance. Such leased connections, however, can significantly increase operating costs for an operator of the wireless network.

Although other technologies such as Ethernet might provide a much more cost efficient alternative to leased T1 connections, communication equipment that supports optical communications through SONET/SDH connections, for example, tends to be geared toward. T1 implementations at the "electrical" connection side.

One possible application of the example communication network 10 would be to allow the Ethernet network 17 to be used as the transport mechanism between the SONET/SDH connections on the optical links 22, 24 and access-side connections (not shown) at the leaf network elements 18, 20. For example, the leaf network elements 18, might include T1 interfaces for connection to existing base station equipment which would otherwise communicate with a core network over T1 connections, and convert to Time Division Multiplexing over Ethernet (TDMoE) to transfer traffic in the Ethernet network 17. At the head network elements 14, 16, traffic is further processed for transfer over the SONET/SDH connections on the optical links 22, 24. Thus, T1 leased lines can be avoided while still transporting traffic to and from a core network through optical links. The head network elements 14, 16 and the leaf network elements 18, 20 handle any interworking between SONET/SDH connections on the optical links 22, 24 and the Ethernet network 17, and between the Ethernet network and access-side T1 connections in this example.

The SONET/SDH ADM 12 may be implemented in substantially the same manner as existing SONET/SDH ADMs. Embodiments of the present invention need not affect the way in which optical links, SONET/SDH connections, and even 1+1 APS for SONET/SDH connections operate, other than potentially initiating an APS operation based on conditions that would not normally cause a protection switch.

Figure 3:
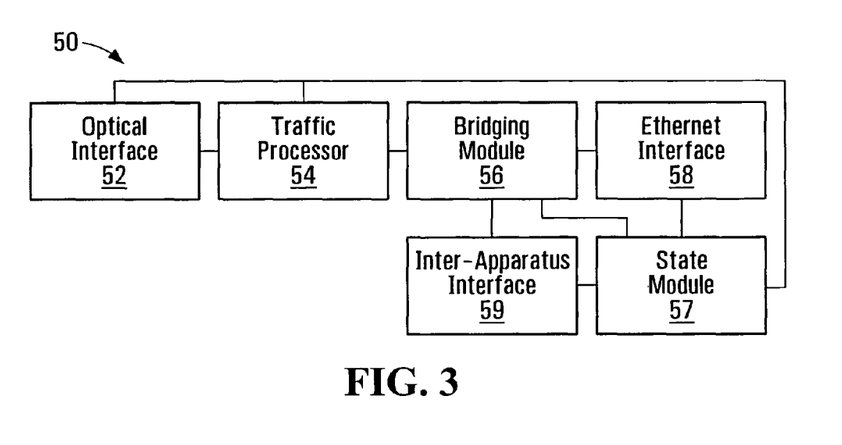
FIG. 3 is a block diagram of an example apparatus according to a further embodiment of the invention.

At least the optical side of the head network elements 14, 16 may similarly be implemented in substantially the same way as existing network components, such as optical and multiplexer network elements. An illustrative example of an apparatus that might be implemented in a head network element 14, 16 to provide additional features in accordance with embodiments of the invention is shown in FIG. 3 and described in further detail below.

Figure 2:
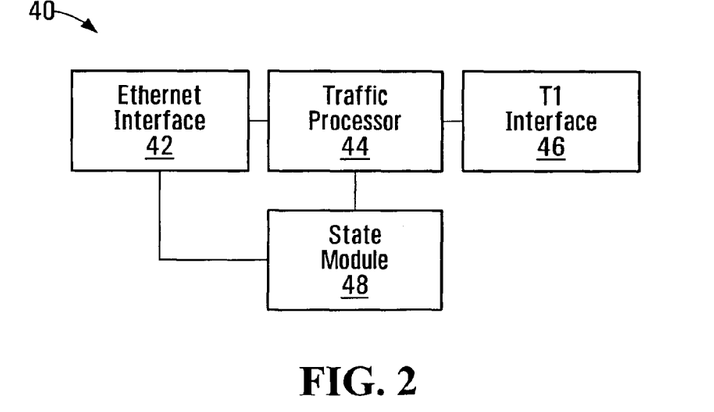
FIG. 2 is a block diagram of an example apparatus according to an embodiment of the invention.

Each leaf network element 18, 20 includes at least an Ethernet interface, an interface to other equipment with which it exchanges communication traffic, and traffic processing components. In one embodiment noted above, each leaf network element 18, 20 includes a T1 interface and allows traffic to be transported through the Ethernet network 17 rather than T1 connections. FIG. 2 illustrates an example apparatus that might be implemented at the leaf network elements 18, 20.

Operation of the network 10 can perhaps best be illustrated by considering an example. Suppose that the leaf network elements 18, 20 include respective Ethernet interfaces that are addressable in the Ethernet network 17 and T1 interfaces for terminating access-side T1 connections. When traffic is received on a T1 connection, the corresponding leaf node 18, 20 generates TDMoE frames destined for one of the head network elements 14, 16. These Ethernet frames carry voice information where the T1 connections at the leaf network elements 18, 20 originate in a base station of a wireless voice communication network for instance. Although the head network elements 14, 16 are intended to provide redundant protection for Ethernet communications in the example network 10, in order to avoid duplicating traffic in the Ethernet network 17 the leaf network elements 18, 20 forward the TDMoE frames to only one of the head network elements 14, 16, as represented at 28, 30.

In one embodiment, one of the head network elements 14, 16 is in a first operating state and the other is in a second operating state at any time. For ease of reference, the first operating state is also described herein as an In-Service state, and the second operating state is described herein as a Standby state. It should be appreciated however, that embodiments are not limited to implementations using states which are characterized in this or any other particular manner. Operating states in redundancy groups are also often referred to as Active and Inactive, for example, and any designations or names may be used for such operating states.

The head network element 14 is in the In-Service state and the head network element 16 is in the Standby state in the example shown in FIG. 1. The leaf network elements 18, 20 send TDMoE frames to the In-Service head network element 14. This is represented in FIG. 1 at 28, 30. Bridging of traffic from the In-Service head network element 14 to the Standby head network element 16 allows redundancy protection to be provided for communications in the Ethernet network 17 even though traffic is sent to only a single destination, namely the In-Service head network element, by the leaf network elements 18, 20. Duplicate Ethernet traffic need not be sent from the leaf network elements 18, 20 to both of the head network elements 14, 16.

Keep-Alive signalling between the Standby head network element 16 and the leaf network elements 18, 20 is represented at 32, 34, and is used in one embodiment to prevent the leaf network elements 18, 20 and intermediate routing components (not shown) in the Ethernet network 17 from aging the address of the Standby head network element out of their routing tables. For example, Keep-Alive signalling might include packets which are sent to the Standby head network element 16 by the leaf network elements 18, 20, and response packets which are echoed back to the leaf network elements by the Standby head network element 16. A similar signalling scheme could be used during startup or initialization to enable the leaf network elements 18, 20 to determine which head network element 14, 16 is to be in the In-Service state.

In the event of a loss or possibly degradation of communications with the In-Service head network element 14, the leaf network elements 18, 20 begin sending traffic to the Standby head network element 16. The Standby head network element 16 then enters the In-Service state, and the former In-Service head network element 14 transitions to the Standby state.

In order to support redundancy protection for SONET/SDH connections on the optical links 22, 24, the same SONET/SDH payload is to be transmitted on both connections. As noted above for the example system 10, however, duplicate Ethernet traffic is not transmitted through the Ethernet network 17 between the leaf network elements 18, 20 and the head network elements 14, 16. The leaf network elements 18, 20 send live TDMoE traffic to only the In-Service head network element, which is the head network element 14 in the example shown in FIG. 1. Payload mirroring for the SONET/SDH connections on the optical links 22, 24 is provided by bridging content, illustratively in the form of Ethernet frames, from the In-Service head network element 14 to the Standby head network element 16 using the connection 26. In an implementation that bridges Ethernet frames between equipment such as the head network elements 14, 16, the connection 26 may be an Ethernet link. Other embodiments may use different types of connections between redundant equipment.

The In-Service head network element 14 receives and processes TDMoE frames to synthesize the SONET/SDH payload for transmission to the SONET/SDH ADM 12, and also re-directs the received frames to the Standby head network element 16 through the connection 26. The Standby head network element 16 receives the TDMoE frames, synthesizes the SONET/SDH payload, and presents it to subtending SONET/SDH equipment, which is the ADM 12 in the example system 10. This provides mirrored SONET/SDH payloads for redundancy protection of communications on the optical links 22, 24, using GR-253 1+1 APS for instance.

Embodiments of the present invention are directed primarily to controlling operating states of redundant equipment such as the head network elements 14, 16 in FIG. 1. Further details regarding the bridging function described briefly above are provided in co-pending U.S. patent application Ser. No. 12/382,030, entitled "BRIDGING FOR SONET/SDH AUTOMATIC PROTECTION SWITCHING", filed of even date herewith, which is incorporated in its entirety herein by reference.

FIG. 2 is a block diagram of an example apparatus 40 according to an embodiment of the invention. The example apparatus 40 includes an Ethernet interface 42, a traffic processor 44 operatively coupled to the Ethernet interface and to a T1 interface 46, and a state module 48 operatively coupled to the Ethernet interface and to the traffic processor. Communication equipment in which the example apparatus 40 is implemented, such as a leaf network element 18, 20 (FIG. 1) may include additional components that have not been explicitly shown in FIG. 2 in order to avoid overly complicating the drawing. More generally, other embodiments may include further, fewer, or different components which may be interconnected in a similar or different order than shown.

The Ethernet interface 42 includes components which support communications over an Ethernet connection. Such an interface often includes hardware at least in the form of a physical port or connector and a Media Access Control (MAC) layer device. The T1 interface 46 similarly includes components such as one or more physical ports or connectors and possibly other components which support communications over respective links, which are T1 connections in the example shown. In one embodiment, the T1 interface 46 and one or more T1 connections enable communications with customer equipment, and the Ethernet interface 42 provides for communications with a core network through an Ethernet connection in a system of the type shown in FIG. 1.

Although FIG. 2 shows an Ethernet interface 42 and a T1 interface 46, embodiments of the present invention are not necessarily limited to only these types of interfaces. In general, the structure of an interface may be dependent upon the type of connection(s) and/or protocol(s) over which information is to be exchanged.

Other components which provide higher-level functions such as communication protocol support may also be implemented in the Ethernet interface 42, in the T1 interface 46, and/or in the traffic processor 44. The traffic processor 44 is intended to represent a module that handles communication traffic that is associated with the apparatus 40. This could include communication traffic that is received by the apparatus 40, communication traffic that is to be transmitted from the apparatus, or both. For example, communication traffic received through the Ethernet interface 42 might include content that is destined for customer equipment that is reachable by the apparatus 40 through the T1 interface 46. Such content could be processed by the traffic processor 44 to convert between different protocols, for instance.

Hardware, firmware, components which execute software, or some combination thereof might be used in implementing the traffic processor 44, and possibly other elements of the example apparatus 40. Electronic devices that may be suitable for this purpose include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

The state module 48 may similarly be implemented using hardware, firmware, and/or components which execute software.

The traffic processor 44 and the state module 48 are defined moreso by their functions as set out herein rather than particular internal structures. The present disclosure would enable a skilled person to implement these components in any of various ways to perform their respective functions.

In operation, the state module 48 selects one of first communication equipment and second communication equipment of a redundant pair to be in a first operating state, illustratively the In-Service state. The redundant pair provides redundancy protection for communication traffic associated with the apparatus 40. In one possible implementation, the apparatus 40 is implemented in the leaf network elements 18, 20 (FIG. 1), and the head network elements 14, 16 form a redundant pair for providing redundancy protection for communication traffic that is transferred between the head network elements and the leaf network elements.

The traffic processor 44 transmits, to only the selected one of the first communication equipment and the second communication equipment, "live" communication traffic that includes content for further transmission from the first communication equipment and the second communication equipment. This causes the selected communication equipment to transition to or remain in the In-Service state and the non-selected communication equipment to transition to or remain in a second operating state, such as the Standby state. It should be appreciated that content for further transmission need not necessarily include the entirety of received traffic, and might include only certain parts or fields in communication traffic that is transmitted from the apparatus 40, such as only part of an Ethernet frame.

Responsive to receiving the live communication traffic, the selected communication equipment determines that it has been selected to be in the In-Service state. This is described in further detail below.

In the example shown in FIG. 2, the state module 48 is operatively coupled to the traffic processor 44, and might therefore provide the traffic processor with an indication as to which communication equipment of a redundant pair is currently In-Service. Another option would be to have the state module 48 set a flag or other indicator in a routing table or other record stored in memory (not shown) so that the traffic processor 44 can identify the In-Service equipment. In general, an indicator of In-Service state, or Standby state, could be provided by the state module 48 directly or indirectly to the traffic processor 44. Other mechanisms for tracking the operating states of equipment in a redundant pair, or at least the equipment that is currently in the In-Service state, are also possible.

Initial selection of In-Service equipment at startup, for example, might involve the traffic processor 44 transmitting maintenance signals, such as the Keep-Alive signals described briefly above, to the first communication equipment and the second communication equipment. The state module 48 can then monitor the Ethernet interface 42 for responses to the maintenance signals by the first communication equipment and the second communication equipment and select one of the first communication equipment and the second communication equipment to be in the In-Service state based on the received responses. According to one possible implementation, multiple maintenance signals are transmitted to the first communication equipment and the second communication equipment, and the state module 48 selects the communication equipment from which a predetermined number of responses to the maintenance signals is first received.

A protection switching operation may be performed when communications with the In-Service communication equipment is interrupted or possibly degraded. The state module 48 may thus detect an operating state switching condition, such as loss of signal or a failure to receive communication traffic from the In-Service equipment within a certain period of time, and select Standby equipment of a redundant pair to be in the In-Service state responsive to detection of the operating state switching condition. The traffic processor then transmits live communication traffic to only the newly selected In-Service equipment.

No further signalling to the redundant equipment is required for the equipment to determine that a change in operating states is necessary. The former Standby equipment receives the live communication traffic, and by virtue of its receipt of that traffic determines that it is now to be the In-Service equipment and transitions to the In-Service state. The former In-Service equipment no longer receives live communication traffic, and determines that it is no longer the In-Service equipment. This determination is automatically made in some embodiments if the former In-Service equipment fails to receive live communication traffic within a certain period of time. This period of time could be set in dependence upon network latency and/or traffic patterns, for example.

Switching transmission of live communication traffic from In-Service equipment to Standby equipment when an operating state switching condition is detected thus causes a switch in operating states of redundant equipment. The In-Service equipment transitions to the Standby state, and the Standby equipment transitions to the In-Service state, all without separate dedicated signalling to the redundant equipment.

Protection switching may be non-revertive or revertive. In a revertive protection switching scheme, the operating states of the redundant equipment are maintained until another protection switching operation is performed. Where manual control is supported, a manual command could be used to cause the redundant equipment to revert back to their original or default operating states, or any other desired In-Service and Standby state arrangement.

A revertive protection switching scheme effectively favors a particular In-Service and Standby state arrangement of redundant equipment. A GR-253 1+1 APS system, for example, might maintain a working device in the In-Service state and a protection device in the Standby state whenever possible. In this case, the operating states of the working and protection devices would be reversed after a protection switch. Although the switched operating states could potentially be maintained after a fault or other APS condition is cleared, it may be possible to automatically revert to the preferred operating states.

This function could be supported in the apparatus 40 by having the state module 48 detect correction of an operating state switching condition. Responsive to detecting that the operating state switching condition that led to a state switch is corrected, the state module 48 could again select the equipment which was selected prior to detection of the operating state switching condition, to be in the In-Service state. Live communication traffic is then transmitted by the traffic processor 44 to only the re-selected communication equipment. This causes the re-selected communication equipment to revert to the In-Service state and the non-selected communication equipment to revert to the Standby state.

Actual detection of an operating state switching condition and subsequent correction of such a condition may be implemented in any of various ways, and in general would be dependent, to at least some extent, on the particular condition to be detected. A loss of signal condition, for example, could potentially be detected as an absence of communication traffic from the In-Service communication equipment during a predetermined period of time. Subsequent receipt of communication traffic could signal that the loss of signal condition has been corrected. Other mechanisms for detecting faults, failures, or other conditions for which a protection switch might be performed could be based on mechanisms that already exist for certain types of connections and/or protocols or designed in accordance with operating state switching conditions that are to be detected. Corresponding correction detection schemes could similarly be based on existing mechanisms or designed to support desired revertive protection behaviour.

Turning now to the protecting equipment, FIG. 3 is a block diagram of an example apparatus 50 according to a further embodiment of the invention, which might be implemented at protecting equipment such as the head network elements 14, 16 in FIG. 1. The example apparatus 50 includes an optical interface 52, a traffic processor 54 operatively coupled to the optical interface, and a bridging module 56 operatively coupled to the traffic processor, to a state module 57, to an Ethernet interface 58, and to an inter-apparatus interface 59. The state module 57 is also operatively coupled to the optical interface 52, to the traffic processor 54, to the Ethernet interface 58, and to the inter-apparatus interface 59. Communication equipment in which the example apparatus 50 is implemented may include additional components that have not been explicitly shown in FIG. 3 in order to avoid overly complicating the drawing. More generally, other embodiments may include further, fewer, or different components which may be interconnected in a similar or different order than shown.

The optical interface 52 includes components which support communications over an optical link, and in particular a SONET/SDH connection in one embodiment. Such components often include hardware at least in the form of a physical port or connector and an optical multiplexer. The exact structure of the optical interface 52 may, to at least some extent, be implementation-dependent, and could vary depending on the type of connection(s) and/or protocol(s) to be supported.

Other components which provide higher-level functions such as communication protocol support may also be implemented, in the optical interface 52 and/or in the traffic processor 54. The traffic processor 54 is intended to represent a module that handles communication traffic that is associated with the apparatus 50. When implemented in a head network element 14, 16 (FIG. 1), for example, the traffic processor 54 might process received Ethernet frames to extract content for transmission via a SONET/SDH connection. Hardware, firmware, components which execute software, or some combination thereof might be used in implementing the traffic processor 54, and possibly other elements of the example apparatus 50. Examples of electronic devices that may be suitable for this purpose have been noted above.

The bridging module 56 and the state module 57 may similarly be implemented using hardware, firmware, and/or components which execute software. The present disclosure would enable a skilled person to implement these modules in any of various ways to perform their respective functions.

The Ethernet interface 58 and the inter-apparatus interface 59, like the optical interface 52, include components such as physical ports or connectors and possibly other components which support communications over respective links. In the case of the Ethernet interface 58, these components may include at least an Ethernet port and a MAC device. The structure of the inter-apparatus interface 59 may be dependent upon the type of connection(s) and/or protocol(s) over which information is to be exchanged between installations of apparatus in a redundant pair. In one embodiment, the inter-apparatus interface 59 is another Ethernet interface.

With reference to FIGS. 2 and 3, an apparatus 40 implemented at protected equipment and an apparatus 50 implemented at protecting equipment would communicate with each other through their respective Ethernet interfaces 42, 58. Installations of an apparatus 50 in protecting equipment of a redundant pair would communicate with each other through their inter-apparatus interfaces 59.

In operation, the optical interface 52 enables communications via a SONET/SDH connection, and the Ethernet interface 58 represents an example of an interface that enables communications with communication equipment for which the apparatus 50, in combination with a further apparatus in a redundant pair, provides redundancy protection. The state module 57 determines that the apparatus 50 is to be in the In-Service state in the redundant pair where communication traffic received from the communication equipment is live communication traffic that includes content for further transmission from the apparatus and the further apparatus. Where the received communication traffic includes no such content, the state module 57 determines that the apparatus 50 is to be in the Standby state in the redundant pair.

According to one embodiment, live communication traffic includes content for transmission from the apparatus 50 through the optical interface 52 via a SONET/SDH connection. This might be voice information in TDMoE frames, for example.

The inter-apparatus interface 59 enables communications between the apparatus 50 and a further or second apparatus which, with the apparatus 50, forms a redundant pair. For full redundancy, the second apparatus has the same structure as the example apparatus 50, and the first apparatus and the second apparatus of a redundant pair communicate through their respective inter-apparatus interfaces 59. The optical interface 52 of the second apparatus enables communications via a second SONET/SDH connection and the Ethernet interface 58 of the second apparatus represents an example of an interface that enables communications with protected equipment. Live communication traffic may be received through the Ethernet interface 58 of the second apparatus, depending on which apparatus is in the In-Service state in the redundant pair.

An apparatus in a redundant pair performs slightly different operations in the In-Service state and the Standby state, since those states impact the interface at which content for transmission via its SONET/SDH connection would be received. During normal operation, only one apparatus in a redundant pair is in each operating state at any time.

When the example apparatus 50 is in the In-Service state, the bridging module 56 receives, through the Ethernet interface 58, communication traffic that includes content for transmission from the apparatus via the SONET/SDH connection supported by the optical interface 52. The content is provided to the optical interface 52 by the bridging module 56, through the traffic processor 54 in the example shown, for transmission via the SONET/SDH connection. The bridging module 56 also transmits the content to the second apparatus through the inter-apparatus interface 59 for transmission via the second SONET/SDH connection.

In this scenario, the second apparatus is in the Standby state. At the second apparatus, the bridging module 56 receives, through the inter-apparatus interface 59, content for transmission from the second apparatus via the SONET/SDH connection supported by its optical interface 52, and provides that content to the optical interface for transmission via the second SONET/SDH connection.

It should be noted that the same apparatus can operate in either of the In-Service and Standby states. Therefore, the bridging module 56 of the example apparatus 50 might pass content that is received through the Ethernet interface 58 to both the optical interface 52 and the inter-apparatus interface 59, which would be the case when the apparatus is in the In-Service state. In the Standby state, an apparatus 50 would not receive live communication traffic through its Ethernet interface 58, since such traffic is sent to only the In-Service apparatus of a redundant pair. Thus, in the Standby state, an apparatus 50 would receive content for transmission on its SONET/SDH connection through its inter-apparatus interface 59, and pass that content to the optical interface.

Thus, a bridging module 46 in an apparatus transmits received content to a further apparatus in a redundant pair unless the content was received from that further apparatus.

In one embodiment, the Ethernet interface 58 enables reception of Ethernet traffic destined for a first Ethernet MAC address, and the Ethernet interface of the second apparatus in the redundant pair enables reception of Ethernet traffic destined for a second Ethernet MAC address that is different from the first Ethernet MAC address. However, only one apparatus of the pair actually receives Ethernet traffic, such as TDMoE traffic in one embodiment, from an Ethernet network at any time. If the example apparatus 50 were implemented at each head network element 14, 16 (FIG. 1), for example, the leaf network elements 18, 20 might have the MAC addresses of both of the head network elements, but send traffic through the Ethernet network 17 to only one of the head network elements. The different MAC addresses provide redundancy protection for communications in the Ethernet network 17, but only one of those addresses is used by the leaf network elements 18, 20 at a time in order to avoid duplicating Ethernet traffic.

The preceding description relates primarily to communication traffic that includes content to be transmitted on SONET/SDH connections. Embodiments of the present invention may also be implemented in conjunction with bidirectional communications. In this case, the apparatus 50 may receive communication traffic through the optical interface 52 and transfer at least some content of that traffic to the Ethernet interface 58 for transmission in Ethernet traffic. In the example network 10 (FIG. 1), traffic received by the head network elements 14, 16 over redundant SONET/SDH connections on the optical links 22, 24 might include content that is to be forwarded on to the leaf network elements 18, 20.

In one implementation, the traffic processor 54 controls the flow of content received from the optical interface 52 to the Ethernet interface 58. In order to avoid duplicating Ethernet traffic in the direction from the head network elements 14, 16 to the leaf network elements 18, 20 (FIG. 1), for instance, only the In-Service head network element 14 might be allowed to pass content from the optical interface 52 to the Ethernet interface 58. The Standby head network element 16 in this case does not pass content from the optical interface 52 to the Ethernet interface 58. In this example, the traffic processor 54 passes or blocks content on the basis of operating state, although this function could potentially be provided by the bridging module 56 or another component in other embodiments.

Since an apparatus 50 operates differently depending on its current operating state in a redundant pair, the state module 57 determines whether the apparatus is in the In-Service state or the Standby state in the redundant pair. The determined state could be reported to the bridging module 56 and/or possibly other components, which then perform any state-dependent operations accordingly. The bridging module 56, for example, might provide received content for transmission through the optical interface 52 and possibly the inter-apparatus interface 59 depending on whether the apparatus 40 is in the In-Service or Standby state. This function could instead be controlled on the basis of the interface through which content is received, as described above. Behaviour of the traffic processor 54, at least in its handling of content received on a SONET/SDH connection, may similarly change depending on current operating state. An indication of current operating state could therefore also or instead be provided to the traffic processor 54 by the state module 57.

Operating state indications could potentially be distributed to components of the apparatus 50 in any of various ways. For instance, a state indication might be provided to each component that performs state-dependent operations each time a change in state is detected by the state module 57. An indication of current operating state could instead be stored in a memory (not shown) by the state module 57 for subsequent access by other components as those components are preparing to perform state-dependent operations. The state module 57 may also or instead support a query/response mechanism, whereby an indication of current state is provided to another component in response to a received query message. Embodiments of the invention are in no way limited to these or any other particular mechanisms for advising other components of the current operating state of the apparatus 50.

A determination of the current operating state of an apparatus 50 may be made on the basis of communication traffic that is received through the Ethernet interface 58. If live communication traffic that includes content for transmission via a SONET/SDH connection through the optical interface 52 is received through the Ethernet interface 58, then the apparatus 50 is in the In-Service state, since live communication traffic is sent to only one apparatus in a redundant pair. If the apparatus 50 is receiving only maintenance signals, on the other hand, the state module 57 determines that the apparatus 50 is in the Standby state.

In some embodiments, state determination could also take into account whether the content for transmission via the SONET/SDH connection is received through the Ethernet interface 58 or through the inter-apparatus interface 59. In the In-Service state, content would be received through the Ethernet interface 58 in Ethernet traffic, whereas in the Standby state content would be received from the second apparatus through the inter-apparatus interface 59.

As noted above, a first apparatus and a second apparatus of a redundant pair may communicate with each other through their inter-apparatus interfaces 59. These interfaces 59 could potentially be used to transfer other information than content that is to be transmitted via SONET/SDH connections. State indications that provide indications of a current operating state of each apparatus in the redundancy pair could be exchanged through the respective inter-apparatus interfaces 59. Since only one apparatus in a redundant pair should be in each state at any time, a state indication from the redundant apparatus would advise an apparatus of the current state of its redundant "mate" apparatus. An apparatus that receives a state indication through its inter-apparatus interface 59 should be in the opposite operating state from its redundant mate apparatus. This could provide an additional check of a current operating state as determined on the basis of communication traffic that is received from protected communication equipment.

Two-way state determination by each apparatus in a redundant pair could be supported where the state module 57 in each apparatus sends a state indication to the other apparatus. Such an indication could use a single bit if only two states are to be detected. In embodiments in which other states are possible, during startup or initialization for instance, additional bits could be used. Other forms of state information are also possible.

Also in the context of startup or initialization, the foregoing description of FIG. 2 noted that protected equipment may transmit maintenance signals to protecting equipment and select the In-Service protecting equipment on the basis of responses to the maintenance signals. The state module 57 may thus cause responses to maintenance signals that are received from protected communication equipment to be transmitted from the apparatus 50 to the protected communication equipment, for use by the protected communication equipment in determining whether to select the apparatus to be in the In-Service state.

The state module 57 may transmit maintenance signal responses itself, by echoing the responses through the Ethernet interface 58 back to the protected equipment from which each maintenance signal is received, for example. Other options are also possible. For example, the state module 57 might command or otherwise control the traffic processor 54 to prepare and transmit the maintenance signal responses.

According to embodiments of the invention, protected equipment, for which redundancy protection is provided by redundant equipment, controls the operating states of the redundant equipment. In the example network 10 of FIG. 1, for example, the operating states of the head network elements 14, 16 can thus be controlled by the leaf network elements 18, 20 in the manner described above.

In some implementations, the protecting equipment may also protect other equipment as well. The head network elements 14, 16, for example, provide redundancy protection for optical communications on the links 22, 24, and accordingly an APS operation affecting the head network elements might also be initiated due to an optical side fault or condition. Therefore, some form of coordination of operating state control might also be provided in some embodiments.

Suppose the leaf network elements 18, 20 switch from the head network element 14 to the head network element 16 as the In-Service head network element due to a problem in the Ethernet network 17. Coordination of operating state control would allow the corresponding switch to also be made for the optical side communications with the SONET/SDH ADM 12.

Standard optical signalling could potentially be used for this purpose. Where the head network elements 12, 14 implement GR-2531+1 Linear APS for communications with the SONET/SDH ADM 12, for instance, there would be a signalling mechanism to allow each head network element to alert the SONET/SDH ADM that it is unavailable. According to an embodiment of the invention, this same signalling mechanism can also be used by the head network elements 14, 16 to signal unavailability to the SONET/SDH ADM 12 in the event of a protection switching operation caused by an Ethernet fault or condition that affects communications with the leaf network elements 18, 20.

With reference to FIG. 3, the state module 57 could provide a state indication to the component of the apparatus 50 that handles availability signalling to optical equipment. This component might be the traffic processor 54 or the optical interface, for example. In the event of a transition from the In-Service state to the Standby, state, optical signalling indicating unavailability is sent from the apparatus 50 to the far-end optical equipment. Thus, the state module 57 may determine, when the apparatus 50 is to be in the Standby state, whether the apparatus is to change from the In-Service state to the Standby state, and if so, cause optical signalling to be sent to optical communication equipment to signal the change in operating state to that equipment.

This optical signalling can be handled by the far-end equipment in accordance with normal APS procedures, such that the far-end optical equipment would also treat the apparatus as being in the Standby state or a other inactive state.

Other coordination mechanism may also be provided. Although re-use of an existing optical signalling mechanism might simplify the implementation of operating state control coordination, a separate signalling function or other mechanism could potentially be used instead. It is expected that a coordination mechanism would, to at least some extent, be dependent upon the equipment and control protocols between which operating state control is to be coordinated.

Examples of apparatus that might be implemented at protected equipment and protecting equipment, as well as their operation, have been described above. Embodiments of the invention can be further illustrated by considering a protection system as a whole.

Figure 4:
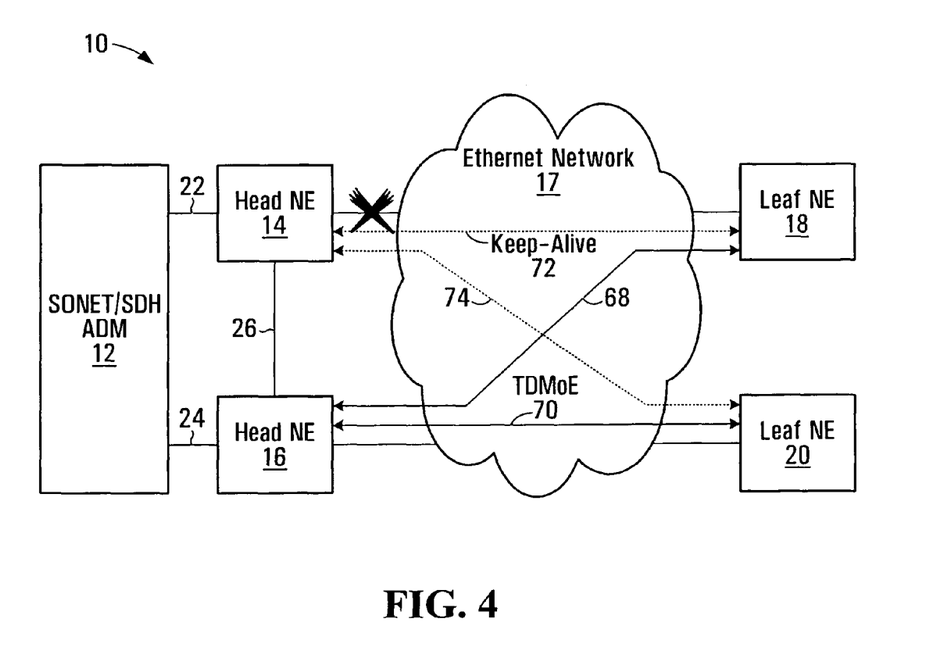
FIG. 4 is a block diagram illustrating a protection switching operation.

FIG. 4 is a block diagram showing a protection switching operation in the example communication network 10 introduced in FIG. 1. It will be apparent from the foregoing description that embodiments of the present invention allow protected equipment such as the leaf network elements 18, 20 to operate in unison in which all leaf network elements select a single head network element 14, 16 to be in the In-Service state. In the example communication network 10, a protection switch between the head network elements 14, 16 may be caused by traditional SONET GR-253 mechanisms such as Loss Of Signal (LOS), Loss Of Frame (LOF), Alarm Indication Signal-Line (AIS-L), Signal Failure or Signal Degrade, and head-end equipment failure. In this regard, operation of the head network elements 14, 16 may be substantially the same as in conventional GR-253 implementations. In accordance with an aspect of the invention, however, a protection switch between the head network elements 14, 16 may also be caused by conditions in the Ethernet network 17, such as loss of Ethernet communication with the leaf network elements 18, 20. Protected leaf network elements that lose communication with the In-Service head network element switch to the Standby head network element.

In FIG. 1, the head network element 14 is in the In-Service state, and the head network element 16 is in the Standby state. FIG. 4 illustrates a loss of Ethernet communications between the In-Service head network element 14 and the leaf network elements 18, 20. The leaf network elements 18, 20 detect the loss of communication with the In-Service head network element 14, and select the Standby head network element 16 to be the In-Service head network element. The leaf network elements 18, 20 begin sending live communication traffic to the head network element 16, which transitions to the In-Service state since it has begun receiving live communication traffic. In the example shown, live communication traffic transfer is represented at 68, 70, and is in the form of TDMoE frames.

The leaf network elements 18, 20 treat the head network element 14 as a Standby unit after a protection switch, and thus send maintenance signals in the form of Keep-Alive signalling to that head network element, as shown at 72, 74. If Ethernet communications with the head network element 14 are restored, in which case the leaf network elements 18, 20 would begin receiving responses to the maintenance signals, the leaf network elements could either revert back to the head network element 14 as the In-Service unit or allow the head network element 16 to remain in the In-Service state until another protection switch is triggered.

Such protection switching affecting the current operating states of the head network elements 14, 16 could also be signalled back to the SONET/SDH ADM 12.

Figure 5:
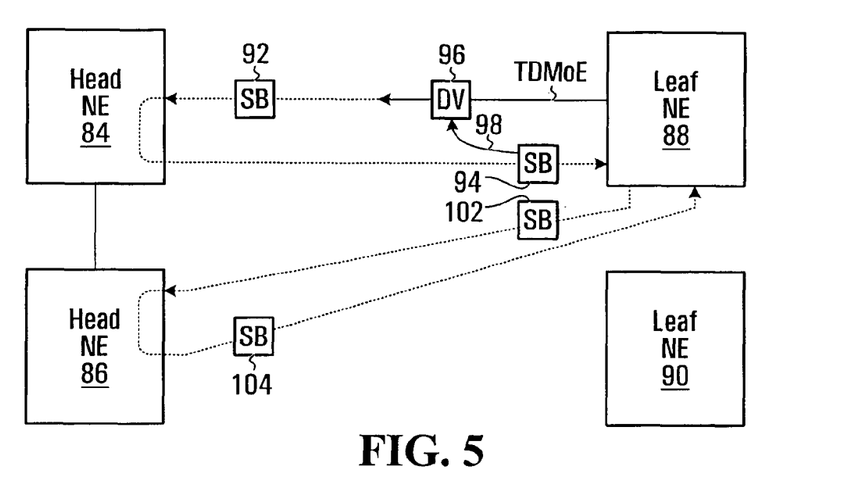
FIGS. 5 to 7 are block diagrams illustrating several example operating scenarios.
Figure 6:
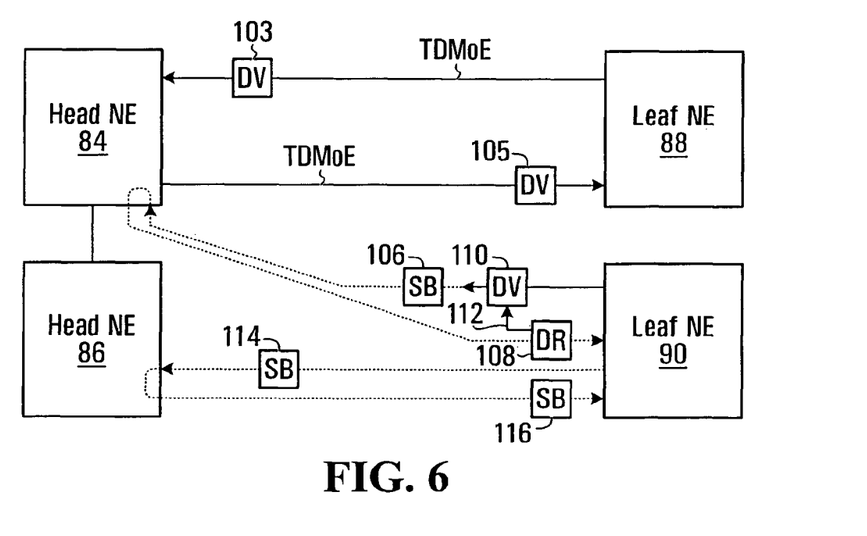
Figure 7:
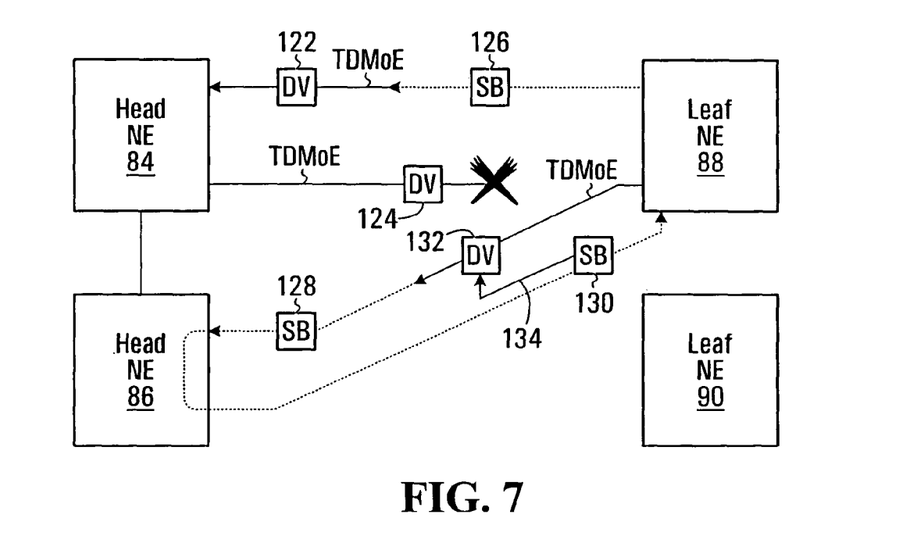

Various operations that are performed on the basis of received communication traffic and maintenance signals have been noted above. FIGS. 5 to 7 are block diagrams illustrating several example operating scenarios which may serve to further demonstrate these operations and signalling between protected and protecting equipment.

The example scenarios shown in FIGS. 5 to 7 are based on a protection system including two head network elements 84, 86 and two leaf network elements 88, 90. The head network elements 84, 86 are connected to each other, and also communicate with the leaf network elements 88, 90. Communications between the head network elements 84, 86 and the leaf network elements 88, 90 use TDMoE in the example shown, and in one embodiment these communications are through Ethernet connections. Other embodiments may use different communication protocols and/or connection types.

In order to avoid overly complicating the drawings, FIGS. 5 to 7 do not explicitly show internal components of the network elements 84, 86, 88, 90 or other equipment that might be provided in a communication system. Thus, it should be appreciated that embodiments of the invention are not in any way limited to the exact implementations shown in FIGS. 5 to 7, which are intended solely for illustrative purposes.

FIG. 5 shows an example scenario of initialization of a protection system in which the redundant head network elements 84, 86 are to provide redundancy protection for the leaf network element 88. The leaf network element 88 sends maintenance signals to both of the head network elements 84, 86. The maintenance signals include indications 92, 102 to signal to the head network elements 84, 86 that the maintenance signals include no content for further transmission from the head network elements and thus are not live communication traffic. These indications 92, 102 are shown in FIG. 5 as SB, for "Standby".

When the maintenance signals are received, the head network elements 84, 86 echo response signals back to the leaf network element 88. The response signals also include SB indications 94, 104 in the example shown. In FIG. 5, the leaf network element 88 selects the head network element 84 to be the In-Service unit based on its response to the maintenance signal. For example, leaf network element 88 might have received the response signal, or possibly a predetermined number of response signals, from the head network element 84 first, before it receives the response signal(s) from the head network element 86. The leaf network element 88 then begins sending live traffic, including TDM data in the example shown, to only the selected head network element 84. The selection of the head network element 84 by the leaf network element 88 on the basis of the received response signal and the subsequent transmission of live communication traffic are represented at 98.

Passive state determination by protecting communication equipment is based on received communication traffic in some embodiments. Protecting communication equipment of a redundant pair may determine whether it is the In-Service equipment by determining whether communication traffic that it receives from protected communication equipment is live communication traffic. In order to facilitate this type of passive determination, the leaf network element 88 could include in live communication traffic an indication 96 that the communication traffic includes content for further transmission from the head network element 84. This indication is shown in FIG. 5 as DV, for "Data Valid". The head network element 84 can then determine that it is the In-Service head network element when it receives communication traffic including the DV indication 96. While the head network element 84 is in the In-Service state, the leaf network element 88 may continue to transmit maintenance signals to and receive responses from the Standby head network element 86.

The scenario shown in FIG. 6 relates to another leaf network element 90 joining an existing protection group. The leaf network element 88 and the In-Service head network element continue to exchange communication traffic including DV indications 103, 105. Maintenance signals and responses may also be exchanged between the leaf network element 88 and the Standby head network element 86, although this has not been shown in FIG. 6 to avoid overly complicating the drawing.

When entering the protection group, the leaf network element 90 transmits maintenance signals to both of the head network elements 84, 86, since it might not be aware of their current operating states unless this has already been manually configured or otherwise entered at the leaf network element. The maintenance signals include SB indications 106, 114. The head network element 86, since it is in the Standby state, responds to the received maintenance signal as usual, with its response including the SB indication 116. The head network element 84, however, is in the In-Service state, and thus responds with a different indication, shown as DR 108, for "Data Ready". This signals to the leaf network element 90 that the head network element 84 has already been selected to be in the In-Service state by the other leaf network element 88 for which the redundant pair 84, 86 provides redundancy protection. The leaf network element 90 then also selects the head network element 84 as the In-Service unit and sends live communication traffic including the DV indication 110 to only that head network element, as represented at 112.

FIG. 7 illustrates a protection switching scenario. The leaf network element 88 exchanges live communication traffic including the DV indication 122, 124 with the In-Service head network element 84. In this example, communication with the In-Service head network element 84 is lost, and the communication traffic including the DV indication 124 is not received by the leaf network element 88. The leaf network element 88 might declare a loss of communication in the absence of communication traffic from the In-Service head network element 84 within a certain amount of time, for example. Other mechanisms for detecting a loss of communications or more generally a operating state switching condition may also be provided. During low traffic periods or if communication traffic might not always be received at regular intervals, maintenance signalling between the In-Service head network element 84 and the leaf network element 88 might be ongoing, for instance. An operating state switching condition could then be detected where neither communication traffic nor a response to a maintenance signal is received by the leaf network element 88 from the head network element 84 within a certain period of time.

As a result of a detected loss of communication, regardless of the actual detection mechanism, the leaf network element 88 may select the Standby head network element 86 to become the In-Service unit. Provided ongoing maintenance signals and responses including the SB indication 128, 130 have been proceeding normally, and as represented at 134, the leaf network element 88 begins sending live communication traffic including the DV indication 132 to the head network element 86.

The leaf network element 90 would behave in a similar manner, to switch from the head network element 84 to the head network element 86 as the In-Service unit.

The indications shown in FIGS. 5 to 7 and described above represent one example of a relatively simple protocol that could be implemented to support operating state control in accordance with one embodiment of the invention. The SB, DR, and DV indications could be different two-bit patterns in TDMoE frames that include source and destination addresses but no actual live data, for example.

In some embodiment, these indications are included in existing data fields. For instance, two-bit indications could be included in the L and R bits in the control word of a Circuit Emulation Service over Ethernet (CESoE) frame according to the MEF-8 specification of the Metro Ethernet Forum. Other implementations which use other data fields and/or signal formats are also possible.

Figure 8:
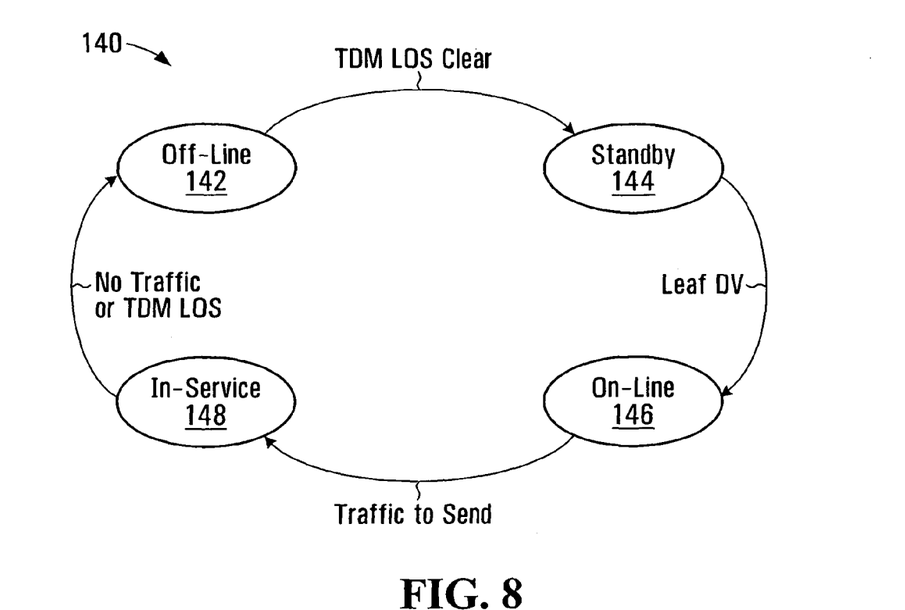
FIG. 8 is an example state diagram.

Embodiments of the invention are also not limited to only two possible states. Although the In-Service and Standby states described above are useful for demonstrating aspects of redundancy protection, other states are also contemplated. FIG. 8 is an example state diagram 140.

The example state diagram 140 includes an Off-Line state 142, the Standby state 144, an On-Line state 146, and the In-Service state 148. Considering the example of head network elements of a redundant pair, each head network element might power up in the Off-Line state 142 and transition to the Standby state 142 unless there is a TDM LOS condition. In the case of a TDM LOS condition, the head network element transitions to the Standby state 144 when the TDM LOS condition clears.

A head network element transitions to the On-Line state 146 in the example shown when it receives communication traffic with the DV indication from a leaf network element, and to the In-Service state 148 when it receives live communication traffic that includes content to be sent onward, over a SONET/SDH connection for instance. A determination as to whether a head network element has traffic or content to send might be made by checking queues or buffers, for example.

The Off-Line state 142 is re-entered if a head network element runs out of traffic to send or in the event of a TDM LOS condition, either of which would be indicative of a problem in communicating with a protected leaf network element. The transition from the In-Service state 148 to the Off-Line state 142 due to a lack of traffic would involve a loss of traffic from all leaf nodes for a period of time, which is adjustable in some embodiments.

The states and transitions shown in FIG. 8 have been described above primarily from the standpoint of Ethernet communications. In an Ethernet/optical implementation such as shown in FIG. 1, conditions on the optical side of a head network element may also affect its operating state. For example, in the event of an APS operation due to an optical fault, the associated head network element detects a loss of optical traffic and/or appropriate unavailability signalling from the subtending optical equipment, and then transitions from the In-Service state 148 to the Off-Line state 142.

It should be apparent from FIG. 8 that communication equipment of a redundant pair may have other states in addition to In-Service and Standby states. The In-Service and Standby states, however, would generally be of most interest for the purposes of redundancy protection.

The states shown in FIG. 8 might also apply to protected equipment, such as leaf network elements, although state transitions and the operations that are performed in the different states may well be different between protecting and protected equipment. Like a head network element, a leaf network element might power up in the Off-Line state 142 and transition to the Standby state 144 in the absence of, or following the clearing of, a TDM LOS condition. The Standby state 144 to On-line state 146 transition for a leaf node might be made when In-Service protecting communication equipment is selected. A leaf network element may transition to the In-Service state 148, in which live communication traffic is sent to only the selected In-Service communication equipment, when the leaf network element has traffic to send to the In-Service equipment or possibly customer equipment, and to the Off-Line state 142 if it runs out of traffic or a TDM LOS condition is detected.

A leaf node might have an additional state transition in the event of a protection switch. Instead of transitioning to the Off-Line state 142 when it runs out of traffic, a leaf network element may instead select Standby protecting communication equipment to become In-Service, and transition back to the On-Line state 146.

Other states and transition criteria may be implemented in other embodiments.

Embodiments of the invention have been described above primarily in terms of example apparatus and systems. Aspects of the invention may also or instead be embodied, for example, in a method.

Figure 9:
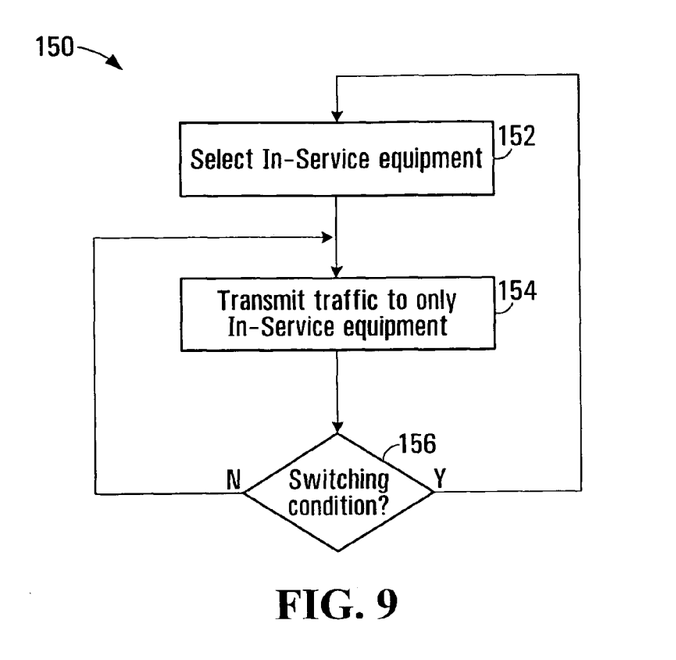
FIG. 9 is a flow diagram illustrating an example method.

FIG. 9 is a flow diagram illustrating an example method 150, which involves selecting, at 152, one of first communication equipment and second communication equipment of a redundant pair to be in a first operating state, illustratively the In-Service state. The redundant pair provides redundancy protection for communication traffic associated with an apparatus. At 154, live communication traffic is transmitted to only the selected communication equipment. This causes the selected communication equipment to transition to or remain in the In-Service state and the non-selected communication equipment to transition tb or remain in a second operating state, illustratively the Standby state.

The selection of In-Service communication equipment at 152 is maintained unless an operating state switching condition is detected at 156. In this case, the Standby communication equipment is selected at 152 to be in the In-Service state responsive to detection of the operating state switching condition at 156. Live communication traffic is then transmitted to only the newly selected communication equipment at 154. This causes the newly selected communication equipment to transition to the In-Service state and the former In-Service communication equipment to transition to the Standby state.

The method 150 is illustrative of one embodiment of the invention. Examples of additional operations, such as revertive switching operations, that may be performed will be apparent from the description and drawings relating to apparatus and system implementations, for example. Further variations may be or become apparent to those skilled in the art.

Figure 10:
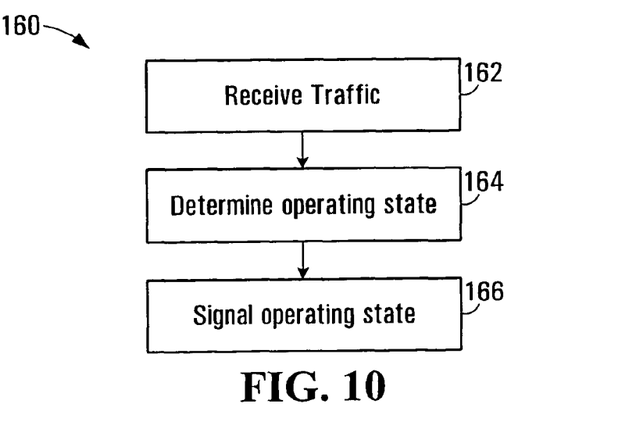
FIG. 10 is a flow diagram illustrating another example method.

FIG. 10 is a flow diagram illustrating another example method. The method 160 relates to protecting communication equipment, such as a head network element.

In the method 160, communication traffic is received at 162. The communication traffic is received, at an apparatus, from communication equipment for which the apparatus, in combination with a further apparatus in a redundant pair, provides redundancy protection. At 164, a determination is made as to the current operating state of the apparatus. The apparatus is determined to be in a first operating state in the redundant pair, illustratively the In-Service state, where the received communication traffic is live communication traffic that includes content for further transmission from the apparatus and the further apparatus. Where the received communication traffic includes no such content, the apparatus is determined to be in a second operating state, illustratively the Standby state. The determined operating state may be signalled to other equipment, as shown at 166.

The example method 160, like the example method 150, is subject to variation in other embodiments. Such variations may be or become apparent, from the foregoing apparatus and system descriptions for instance.

Embodiments of the present invention may allow more potential stimulus points for protection switching than traditional SONET/SDH modes of APS, such as in the Ethernet domain. Protection can then be provided not only for optical-side faults or failures, but also for Ethernet failures. Redundancy protection for Ethernet communications is provided without duplicating Ethernet traffic, since live communication traffic is sent to only an In-Service head network element, for example. Minimal additional Ethernet traffic, in the form Keep-Alive signalling in some embodiments, is exchanged between head and leaf network elements in order to allow switching fabric and/or other intermediate Ethernet network components to prevent their MAC addressing tables from aging. This in turn prevents Ethernet broadcasts within the network when an APS event occurs, since Ethernet network components would not have aged a Standby head network element out of addressing tables and thus would not need to locate that network element through Ethernet broadcasts. Revertive capabilities are also supported in some embodiments, since leaf network elements transmit maintenance signals to a former In-Service head network element in the event of a protection switch. Reverting to a former In-Service unit that subsequently becomes operational again may be automatic or manually controlled.

The techniques disclosed herein are thus not just traditional SONET/SDH GR-253 APS. Additional protection points within a network, and in some embodiments within the Ethernet domain, can be provided.

What has been described is merely illustrative of the application of principles of embodiments of the invention. Other arrangements and methods can be implemented by those skilled in the art without departing from the scope of the present invention.

For example, the divisions of functions shown in FIGS. 2 and 3 are illustrative of embodiments of the invention. Further, fewer, or different elements may be used to implement the techniques disclosed herein.

It should also be appreciated that elements that have been shown similarly in the drawings need not necessarily be entirely identical. The indications in FIGS. 5-7, for instance, could potentially have different forms depending on where the indications originate. An SB indication that is sent by a leaf network element to a head network element might not be identical to the SB indication that is sent by a head network element to a leaf network element, even though this might simplify a protocol that is used between the network elements.

In addition, although described primarily in the context of methods and systems, other implementations of the invention are also contemplated, as computer-readable media encoded with computer executable instructions, for example.

We claim:

1. An apparatus comprising:

a state module that selects one of first communication equipment and second communication equipment of a redundant pair to be in an In-Service operating state in the redundant pair, the redundant pair providing redundancy protection for communication traffic associated with the apparatus; and a traffic processor, operatively coupled to the state module, that controls operating states of the first communication equipment and the second communication equipment by transmitting, to only the selected one of the first communication equipment and the second communication equipment, live communication traffic including content for further transmission from the one of the first communication equipment and the second communication equipment, the live communication traffic causing the selected one of the first communication equipment and the second communication equipment to transition to the In-Service operating state and absence of the live communication traffic at the other of the first communication equipment and the second communication equipment causing the other of the first communication equipment and the second communication equipment to transition to a Standby operating state in the redundant pair, wherein the traffic processor transmits maintenance signals to the first communication equipment and the second communication equipment, and wherein the state module selects one of the first communication equipment and the second communication equipment to be in the In-Service operating state based on responses to the maintenance signals by the first communication equipment and the second communication equipment, wherein the traffic processor includes in the live communication traffic transmitted to only the one of the first communication equipment and the second communication equipment a first indication that the live communication traffic includes content for further transmission from the one of the first communication equipment and the second communication equipment, wherein the traffic processor includes in each of the maintenance signals a second indication that the maintenance signal includes no content for further transmission from the first communication equipment and the second communication equipment, wherein the first communication equipment and the second communication equipment respond to the maintenance signals with either the second indication or, if the communication equipment has been selected to be in the In-Service operating state by another apparatus for which the redundant pair provides redundancy protection, with a third indication that the communication equipment has been selected by the other apparatus to be in the In-Service operating state.

2. The apparatus of claim 1, wherein the traffic processor transmits a plurality of maintenance signals to the first communication equipment and the second communication equipment, and the state module selects the one of the first communication equipment and the second communication equipment from which a predetermined number of responses to the maintenance signals is first received.

3. The apparatus of claim 1,
wherein the state module further detects an operating state switching condition, and selects the other of the first communication equipment and the second communication equipment to be in the In-Service operating state responsive to detection of the operating state switching condition,
wherein the traffic processor transmits to only the other of the first communication equipment and the second communication equipment live communication traffic including content for further transmission from the other of the first communication equipment and the second communication equipment, the live communication traffic causing the other of the first communication equipment and the second communication equipment to transition from the Standby operating state to the In-Service operating state and absence of the live communication traffic at the one of the first communication equipment and the second communication equipment causing the one of the first communication equipment and the second communication equipment to transition from the In-Service operating state to the Standby operating state.

4. The apparatus of claim 3,
wherein the state module further detects correction of the state switching condition, and selects the one of the first communication equipment and the second communication equipment to be in the In-Service operating state responsive to detection of correction of the operating state switching condition,
wherein the traffic processor transmits to only the one of the first communication equipment and the second communication equipment live communication traffic including content for further transmission from the one of the first communication equipment and the second communication equipment, the live communication traffic causing the one of the first communication equipment and the second communication equipment to revert to the In-Service operating state and absence of the live communication traffic at the other of the first communication equipment and the second communication equipment causing the other of the first communication equipment and the second communication equipment to revert to the Standby operating state.

5. A system comprising:
the apparatus of claim 1;
the first communication equipment; and
the second communication equipment,
the selected one of the first communication equipment and the second communication equipment determining that it has been selected to be in the In-Service operating state responsive to receiving the live communication traffic including content for further transmission from the one of the first communication equipment and the second communication equipment.

6. The apparatus of claim 1, the first and second communication equipment comprising head network elements (NEs) operatively coupled to network-side communication links, the apparatus comprising a leaf network element (NE) with which the head NEs communicate and which is operatively coupled to one or more access-side communication links.

7. The apparatus of claim 6, the network-side communication links comprising optical links, the head NEs communicating with the leaf NE through an Ethernet network.

8. A method comprising:
selecting one of first communication equipment and second communication equipment of a redundant pair to be in an In-Service operating state in the redundant pair, the redundant pair providing redundancy protection for communication traffic associated with an apparatus; and
controlling operating states of the first communication equipment and the second communication equipment by transmitting, to only the selected one of the first communication equipment and the second communication equipment, live communication traffic including content for further transmission from the one of the first communication equipment and the second communication equipment, the live communication traffic causing the selected one of the first communication equipment and the second communication equipment to transition to the In-Service operating state and absence of the live communication traffic at the other of the first communication equipment and the second communication equipment causing the other of the first communication equipment and the second communication equipment to transition to a Standby operating state in the redundant pair,
the method further comprising:
transmitting maintenance signals to the first communication equipment and the second communication equipment,
wherein selecting comprises selecting one of the first communication equipment and the second communication equipment to be in the In-Service operating state based on responses to the maintenance signals by the first communication equipment and the second communication equipment,
wherein transmitting the live communication traffic to only the selected one of the first communication equipment and the second communication equipment comprises including in the live communication traffic a first indication that the live communication traffic includes content for further transmission from the one of the first communication equipment and the second communication equipment,
wherein transmitting the maintenance signals comprises including in each of the maintenance signals a second indication that the maintenance signal includes no content for further transmission from the first communication equipment and the second communication equipment,
wherein the first communication equipment and the second communication equipment respond to the maintenance signals with either the second indication or, if the communication equipment has been selected to be in the In-Service operating state by another apparatus for which the redundant pair provides redundancy protection, with a third indication that the communication equipment has been selected by the other apparatus to be in the In-Service operating state.

9. The method of claim 8, further comprising:
detecting an operating state switching condition;
selecting the other of the first communication equipment and the second communication equipment to be in the In-Service operating state responsive to detection of the operating state switching condition; and
transmitting to only the other of the first communication equipment and the second communication equipment live communication traffic including content for further transmission from the other of the first communication equipment and the second communication equipment, the live communication traffic causing the other of the first communication equipment and the second communication equipment to transition from the Standby operating state to the In-Service operating state and absence of the live communication traffic at the one of the first communication equipment and the second communication equipment causing the one of the first communication equipment and the second communication equipment to transition from the In-Service operating state to the Standby operating state.

10. The method of claim 9, further comprising:
detecting correction of the state switching condition;
selecting the one of the first communication equipment and the second communication equipment to be in the In-Service operating state responsive to detection of correction of the operating state switching condition; and
transmitting to only the one of the first communication equipment and the second communication equipment live communication traffic including content for further transmission from the one of the first communication equipment and the second communication equipment, the live communication traffic causing the one of the first communication equipment and the second communication equipment to revert to the In-Service operating state and absence of the live communication traffic at the other of the first communication equipment and the second communication equipment causing the other of the first communication equipment and the second communication equipment to revert to the Standby operating state.

11. The method of claim 8, further comprising:
receiving, at the selected one of the first communication equipment and the second communication equipment, the live communication traffic including content for further transmission from the one of the first communication equipment and the second communication equipment, the selected one of the first communication equipment and the second communication equipment determining that it has been selected to be in the In-Service operating state responsive to receiving the live communication traffic including content for further transmission from the one of the first communication equipment and the second communication equipment.

12. A non-transitory computer-readable medium encoded with computer executable instructions which when executed cause a computer to perform the method of claim 8.

13. An apparatus comprising:
an interface that enables communications with communication equipment for which the apparatus, in combination with a further apparatus in a redundant pair, provides redundancy protection; and
a state module operatively coupled to the interface, the state module determining that the apparatus is to transition to an In-Service operating state in the redundant pair where communication traffic received from the communication equipment is live communication traffic that includes content for further transmission from the apparatus, and determining that the apparatus is to transition to a Standby operating state in the redundant pair where the received communication traffic includes no content for further transmission from the apparatus,
wherein the state module further causes responses to maintenance signals received from the communication equipment to be transmitted from the apparatus to the communication equipment, the responses being for use by the communication equipment in determining whether to select the apparatus to be in the In-Service operating state,
wherein the live communication traffic that includes content for further transmission from the apparatus comprises a first indication,
wherein the maintenance signals comprise a second indication that the maintenance signals include no content for further transmission from the apparatus and the further apparatus,
wherein the responses to the maintenance signals comprise either the second indication or, if the apparatus has been selected to be in the In-Service operating state by further communication equipment for which the redundant pair provides redundancy protection, a third indication that the apparatus has been selected by the further communication equipment to be in the In-Service operating state.

14. The apparatus of claim 13, further comprising:
an optical interface that enables communications with optical communication equipment, for which the redundant pair further provides redundancy protection,
wherein the interface comprises an Ethernet interface,
wherein the state module further causes optical signalling to be sent to the optical communication equipment to signal to the optical communication equipment the transition to the Standby operating state.

15. The apparatus of claim 13, the apparatus and the further apparatus comprising head network elements (NEs) operatively coupled to network-side communication links, the communication equipment comprising a leaf network element (NE) with which the head NEs communicate and which is operatively coupled to one or more access-side communication links.

16. A method comprising:
receiving, at an apparatus, communication traffic from communication equipment for which the apparatus, in combination with a further apparatus in a redundant pair, provides redundancy protection;
determining that the apparatus is to transition to an In-Service operating state in the redundant pair where the communication traffic received from the communication equipment is live communication traffic that includes content for further transmission from the apparatus; and
determining that the apparatus is to transition to a Standby operating state in the redundant pair where the received communication traffic includes no content for further transmission from the apparatus,
the method further comprising:
receiving maintenance signals from the communication equipment; and
transmitting responses to the maintenance signals from the apparatus to the communication equipment, the responses being for use by the communication equipment in determining whether to select the apparatus to be in the In-Service operating state, wherein the live communication traffic that includes content for further transmission from the apparatus comprises a first indication, wherein the maintenance signals comprise a second indication that the maintenance signals include no content for further transmission from the apparatus and the further apparatus, wherein the responses to the maintenance signals comprise either the second indication or, if the apparatus has been selected to be in the In-Service operating state by further communication equipment for which the redundant pair provides redundancy protection, a third indication that the apparatus has been selected by the further communication equipment to be in the In-Service operating state.

17. The method of claim 16, wherein the communication traffic comprises Ethernet traffic, wherein the content comprises content for further transmission from the apparatus to optical communication equipment, for which the redundant pair further provides redundancy protection, wherein the method further comprises:

signalling to the optical equipment the transition to the Standby operating state.

18. A non-transitory computer-readable medium encoded with computer executable instructions which when executed cause a computer to perform the method of claim 16.

* * * * *